United States Patent
Kung et al.

(10) Patent No.: US 9,348,351 B2
(45) Date of Patent: May 24, 2016

(54) SWITCH CIRCUIT (71) Applicant: Industrial Technology Research Institute, Hsin-Chu (TW)

(72) Inventors: Che-Min Kung, Taipei (TW); Jung-Min Hwang, Hsinchu (TW); Wei-Ming Chen, Changhua County (TW); Chi-Chun Huang, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 275 days.

(21) Appl. No.: 13/942,872

(22) Filed: Jul. 16, 2013

(65) Prior Publication Data

US 2014/0139193 A1    May 22, 2014

(30) Foreign Application Priority Data

Nov. 19, 2012    (TW) ................................ 101143087

(51) Int. Cl.
*H02M 3/07* (2006.01)
*G05F 3/02* (2006.01)

(52) U.S. Cl.
CPC . *G05F 3/02* (2013.01); *H02M 3/07* (2013.01); *Y10T 307/747* (2015.04)

(58) Field of Classification Search
CPC .... H02M 2003/072; H02M 3/06; H02M 3/07
See application file for complete search history.

(56) References Cited

U.S. PATENT DOCUMENTS

| | | | |
|---|---|---|---|
| 4,138,715 A | 2/1979 | Miller |
| 5,880,940 A | 3/1999 | Poon |
| 6,018,469 A | 1/2000 | Poon |
| 6,084,789 A | 7/2000 | Van Lieshout |
| 6,166,500 A | 12/2000 | Makaran |
| 6,310,789 B1 | 10/2001 | Nebrigic et al. |
| 6,473,318 B1 | 10/2002 | Qian et al. |
| 6,512,411 B2 | 1/2003 | Meng et al. |

(Continued)

FOREIGN PATENT DOCUMENTS

| | | |
|---|---|---|
| CN | 1143859 | 2/1997 |
| CN | 2263351 | 9/1997 |

(Continued)

OTHER PUBLICATIONS

Wenhan et al., "A Variable Step-Down Conversion Ratio Switched Capacitor DC-DC Converter for Energy Harvesting Systems Working in Intermittent Mode". Journal of Semiconductors, vol. 30, No. 12, Dec. 2009. pp. 1-4.*

(Continued)

*Primary Examiner* — Vuthe Siek
*Assistant Examiner* — Aric Lin
(74) *Attorney, Agent, or Firm* — WPAT, P.C.; Justin King; Jonathan Chiang (57) ABSTRACT

The present disclosure relates to a switch circuit. The switch circuit comprises: a plurality of storing elements and a plurality of switch elements. The plurality of switch elements coupled the plurality of storing elements for generating a step-down mode. Moreover, the switch elements, controllers and parts of resistors in the present disclosure are integrated in an integrated circuit so as to effectively reduce size and weight of the driving circuit, advance the circuit suitability, and decrease the development cost of the circuit.

9 Claims, 13 Drawing Sheets

(56) References Cited

U.S. PATENT DOCUMENTS

| | | | |
|---|---|---|---|
| 6,630,805 B2 | 10/2003 | Makaran | |
| 7,304,871 B2 | 12/2007 | Ito et al. | |
| 7,342,389 B1 | 3/2008 | Wu et al. | |
| 7,397,677 B1 | 7/2008 | Collins et al. | |
| 7,557,641 B2 | 7/2009 | Bartholomeusz et al. | |
| 7,795,761 B2 | 9/2010 | Chen et al. | |
| 8,000,112 B2 | 8/2011 | Zhang | |
| 2001/0000293 A1 | 4/2001 | Makaran | |
| 2005/0047180 A1* | 3/2005 | Kim | 363/59 |
| 2007/0194363 A1 | 8/2007 | Georgescu et al. | |
| 2008/0074058 A1 | 3/2008 | Hung et al. | |
| 2009/0257255 A1 | 10/2009 | Zhang | |
| 2010/0123448 A1 | 5/2010 | Neidorff et al. | |
| 2011/0298433 A1 | 12/2011 | Tam | |

FOREIGN PATENT DOCUMENTS

| | | |
|---|---|---|
| CN | 1409473 A | 4/2003 |
| CN | 2549645 | 5/2003 |
| CN | 1773842 | 5/2006 |
| CN | 1832565 | 9/2006 |
| CN | 1992490 A | 7/2007 |
| CN | 200959514 | 10/2007 |
| CN | 101212134 | 7/2008 |
| CN | 101272423 | 9/2008 |
| CN | 101340144 | 1/2009 |
| CN | 101465599 A | 6/2009 |
| CN | 101727120 | 6/2010 |
| CN | 101783108 | 7/2010 |
| CN | 101854065 | 10/2010 |
| CN | 101908831 | 12/2010 |
| CN | 201682416 U | 12/2010 |
| CN | 102082505 A | 6/2011 |
| CN | 202076852 | 12/2011 |
| CN | 202197081 | 4/2012 |
| CN | 102469666 | 5/2012 |
| CN | 102473149 | 5/2012 |
| CN | 102480224 A | 5/2012 |
| CN | 102484423 A | 5/2012 |
| TW | 373406 | 11/1999 |
| TW | I293406 | 2/2008 |
| TW | I329407 | 8/2010 |
| TW | I342120 | 5/2011 |

OTHER PUBLICATIONS

High efficiency, 250-mA step-down charge pump TI (data sheet) 2002.
Design of a wide-input-range DC-DC converter with switched-capacitor technique Ming-Hsien Shih; Chia-Ling Wei International Conference on Green Circuits and Systems Jun. 2010.
Bi-directional integrated charge pumps Chit-Sang Chan; Wing-Hung Ki; Chi-Ying Tsui International Symposium on Circuits and Systems 2002.
High efficiency, inductorless step-down DC/DC converter Shao Bin; Yang Yujia; Wang Ying; Hong Zhiliang International Conference on ASIC Oct. 2005.
A Family of Multimodes Charge Pump based DC-DC Converter With High Efficiency over Wide Input and Output Range Guo, R.; Liang, Z.; Huang, A. Q. IEEE Transactions on Power Electronics Nov. 2012.
TI(TPS6050X).
MAXIM(1730).
Taiwan Patent Office, "Office Action", Jun. 11, 2014.
China Patent Office "Office Action" issued on Sep. 30, 2015.
Hao et al. "A Variable Step-Down Conversion Ratio Switched Capacitor DC-DC Converter for Energy Harvesting Systems Working in Intermittent Mode", Dec. 2009, vol. 30, No. 12, Journal of Semiconductors, Beijing, China.

* cited by examiner

SWITCH CIRCUIT

This application claims the benefit of Taiwan application Serial No. 101143087, filed Nov. 19, 2012, the disclosure of which is incorporated by reference herein in its entirety.

BACKGROUND

1. Technical Field

The disclosed embodiments relate in general to a switch circuit, and more particularly to a switch circuit having capacitors and switch elements.

2. Description of the Related Art

Current electronic products, having entered a portable era, are developed towards targets of being compact and low in market prices. However, due to a large number of external components, a volume of a printed circuit board (PCB) is increased to limit a size and an appearance of a product. For example, in most market-available power conversion circuits such as DC/DC converters, charge pump circuits and switched capacitor circuits, elements from power switches, passive elements to control circuits, are all formed by discrete components. Since not only component prices are reducing at a slow and have small margins left for further reduction, but also raw materials are also becoming more costly, assembly costs are increased as the number of employed discrete components grows. Consequently, a PCB becomes larger and heavier.

Further, compared to resistors or ceramic capacitors, magnetic elements have a greater volume and higher costs. Electrolytic capacitors in light-emitting diodes (LED) are prone to interference from the LEDs, and hence have a shortened lifecycle. With a temperature rise of every 10 degree Celsius, the lifecycle of electrolytic capacitors is reduced by 50%. Therefore, there is a need for a driver circuit free of magnetic elements and free of electrolytic capacitors. To effectively reduce the product weight and volume, the integrated circuit technology is a crucial development. Integrated circuits are capable of integrating most external discrete components, e.g., transistors, capacitors and diodes. By replacing a conventional PCB with an integrated circuit having an extremely small volume, the volume and weight can be decreased while also increasing the transmission speed and reliability. However, in addition to high manufacturing costs, an integrated circuit also has a chip area that is directly proportional to costs.

Further, assuming that power switch elements in power conversion circuits are to be integrated to an integrated circuit, a chip area occupied by the power switch elements is quite considerable. In general, a high-power switch element occupies an area of above 5 to 10 times of that of overall control circuits. That is to say, a significant amount of manufacturing costs is consumed if numerous power switch elements are employed in the circuit. Under a condition of generating three to four step-down modes using three capacitors in a conventional switched capacitors, at least eight to nine power switch elements are required and thus render a much too large chip size.

SUMMARY

According to one embodiment, a switch circuit is provided. The switch circuit includes multiple energy storage elements, and multiple switch elements coupled to the energy storage elements to generate a step-down mode.

According to another embodiment, a switch circuit is provided. The switch circuit includes multiple energy storage elements, and multiple switch elements coupled to the energy storage elements to generate either a step-down mode or a step-up mode.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
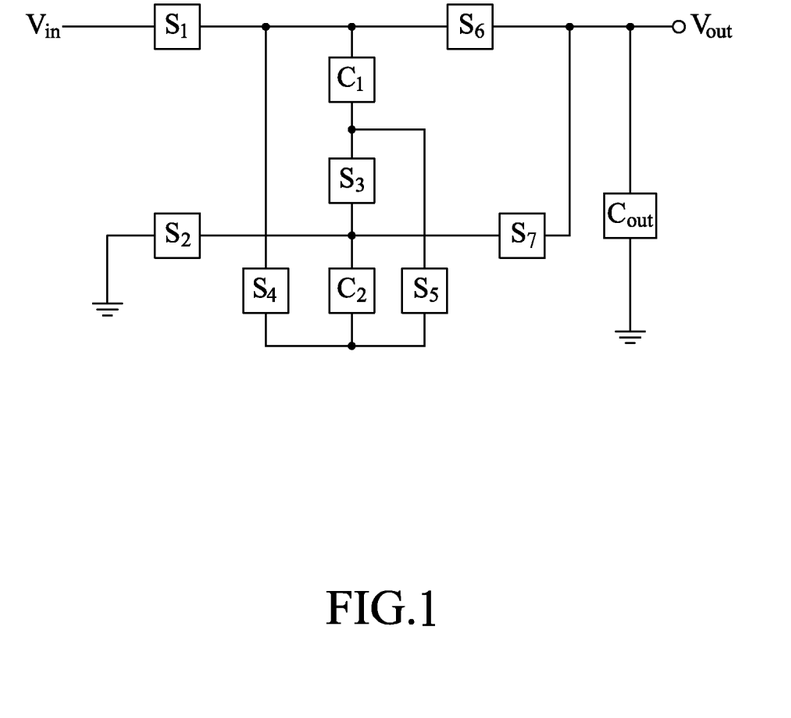
FIG. 1 shows a switch circuit according to one embodiment.

FIG. 1 shows a switch circuit according to one embodiment. The switch circuit includes multiple energy storage elements and multiple switch elements. The switch elements are coupled to the energy storage elements to generate step-down modes. The energy storage elements include a first energy storage element $C_1$, a second energy storage element $C_2$ and a third energy storage element $C_{out}$. The switch elements include a first switch element $S_1$, a second switch element $S_2$, a third switch element $S_3$, a fourth switch element $S_4$, a fifth switch element $S_5$, a sixth switch element $S_6$ and a seventh switch element $S_7$. As shown in FIG. 1, the first energy storage element $C_1$ has one terminal coupled to the first, fourth and sixth switch elements $S_1$, $S_4$ and $S_6$, and the other terminal coupled to the third and fifth switch elements $S_3$ and $S_5$. The second energy storage element $C_2$ has one terminal coupled to the second, third and seventh switch elements $S_2$, $S_3$ and $S_7$, and the other terminal coupled to the fourth and fifth switch elements $S_4$ and $S_5$. The third energy storage element $C_{out}$ has one terminal coupled to the sixth and seventh switch elements $S_6$ and $S_7$. In the embodiment, the energy storage elements may be capacitors, and the switch elements may be metal oxide semiconductor (MOS) or bipolar junction transistor (BJT) elements. In the embodiment, the step-down modes are generated according to charging/discharging operations of the energy storage elements and switching operations of the switch elements, and are thus in plural. In the embodiment, the polarity of the capacitor $C_2$ is inverted, and the capacitors $C_1$ and $C_2$ are jointly grounded via the switch elements $S_2$ and $S_3$, so that the embodiment saves one power switch element compared to a conventional switch circuit. Further, via the switch element $S_4$, the two capacitors $C_1$ and $C_2$ may also directly connect to an input power $V_{in}$ to similarly save one power switch element. Therefore, in the embodiment, four step-down modes are provided by using merely seven power transistors, thereby enhancing circuit adaptivity as well as reducing circuit development costs.

Figure 2:
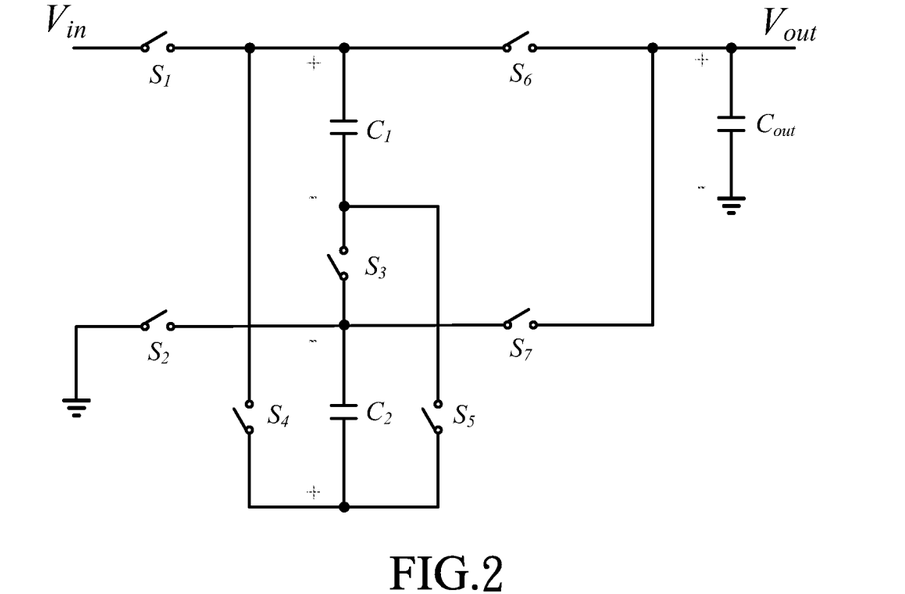
FIG. 2 shows an application example of the capacitors and switches in FIG. 1.

FIG. 2 shows an application example of the capacitors and switches in FIG. 1. FIGS. 3 to 6 show four step-down modes of FIG. 2. Table-1 shows a voltage ratio ($V_{out}/V_{in}$) of the step-down modes and the switch elements to be turned on between charging (phase 1) and discharging (phase 2) of the energy storage elements.

TABLE 1

| Voltage ratio ($V_{out}/V_{in}$) | Phase 1 (charging) | Phase 2 (discharging) |
|---|---|---|
| 1 | | $S_1, S_2, S_3, S_4, S_6$: on |
| 1/2 | $S_1, S_3, S_4, S_7$: on | $S_2, S_3, S_4, S_6$: on |
| 1/3 | $S_1, S_5, S_7$: on | $S_2, S_3, S_4, S_6$: on |
| 2/3 | $S_1, S_3, S_4, S_7$: on | $S_2, S_5, S_6$: on |

Figure 3:
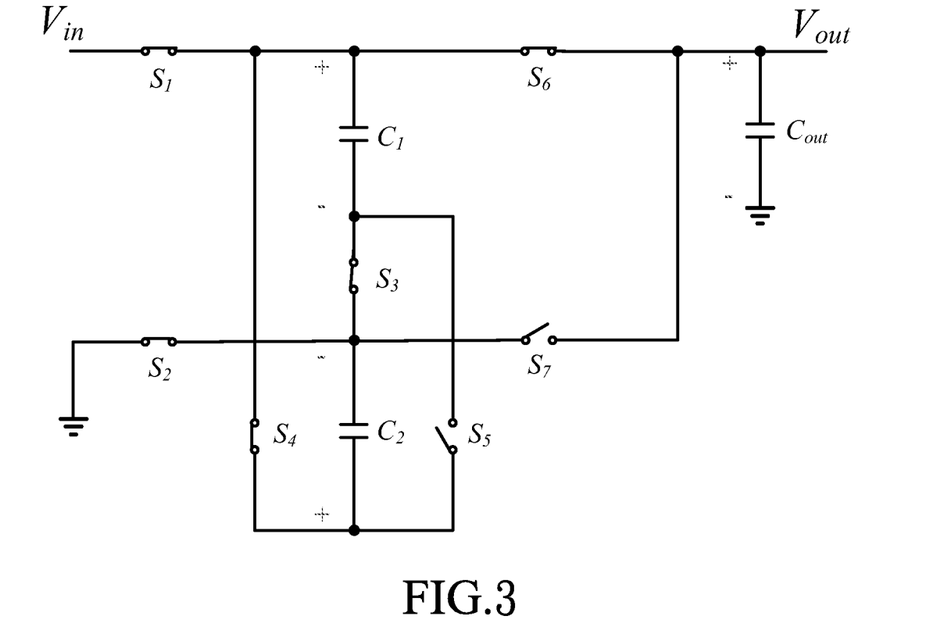
FIG. 3 shows a first step-down mode of FIG. 2.

FIG. 3 shows a first step-down mode of FIG. 2. Referring to FIG. 3, when the voltage ratio ($V_{out}/V_{in}$) of a desired output voltage to the input voltage is 1, the switch elements $S_1$, $S_2$, $S_3$, $S_4$ and $S_6$ need to be turned on regardless of when the energy storage elements are charged (phase 1) or discharged (phase 2).

Figure 4A:
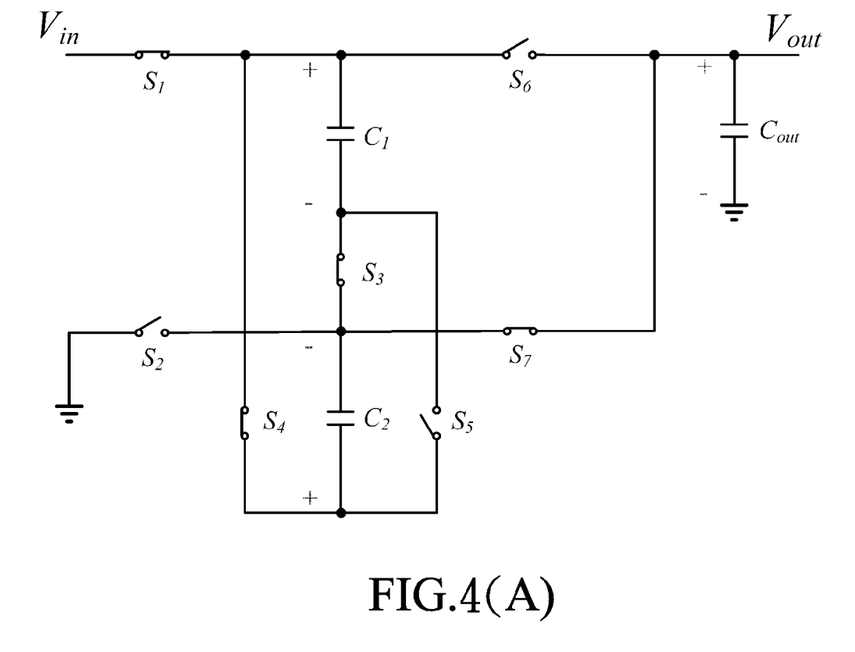
FIG. 4(A) and FIG. 4(B) show a second step-down mode of FIG. 2.
Figure 4B:
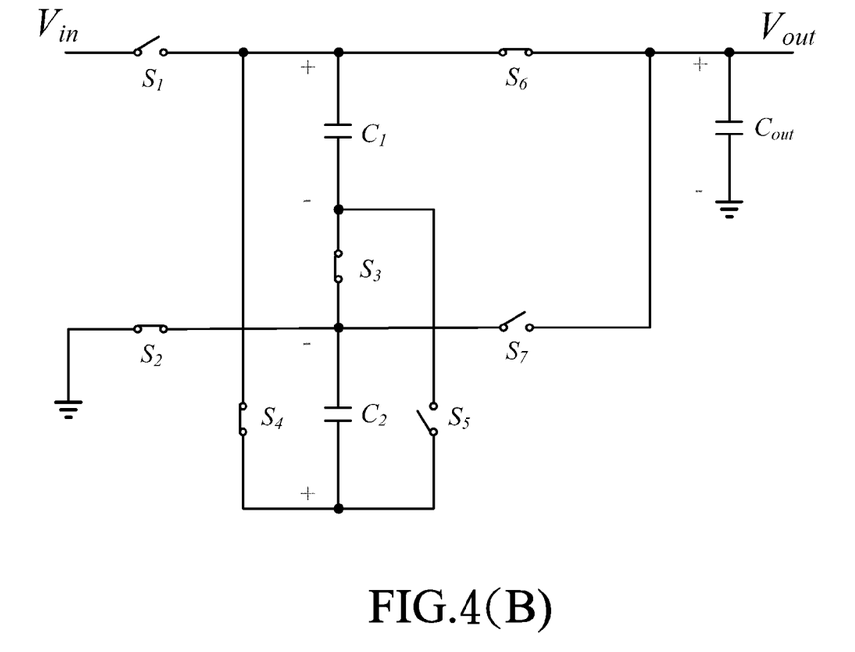

FIG. 4 shows a second step-down mode of FIG. 2. When the voltage ratio ($V_{out}/V_{in}$) of a desired output voltage to the input voltage is ½, the switch elements $S_1$, $S_3$, $S_4$ and $S_7$ need to be turned on when the energy storage elements are charged (phase 1), as shown in FIG. 4(A); and the switch elements $S_2$, $S_3$, $S_4$ and $S_6$ need to be turned on when the energy storage elements are discharged (phase 2), as shown in FIG. 4(B).

Figure 5A:
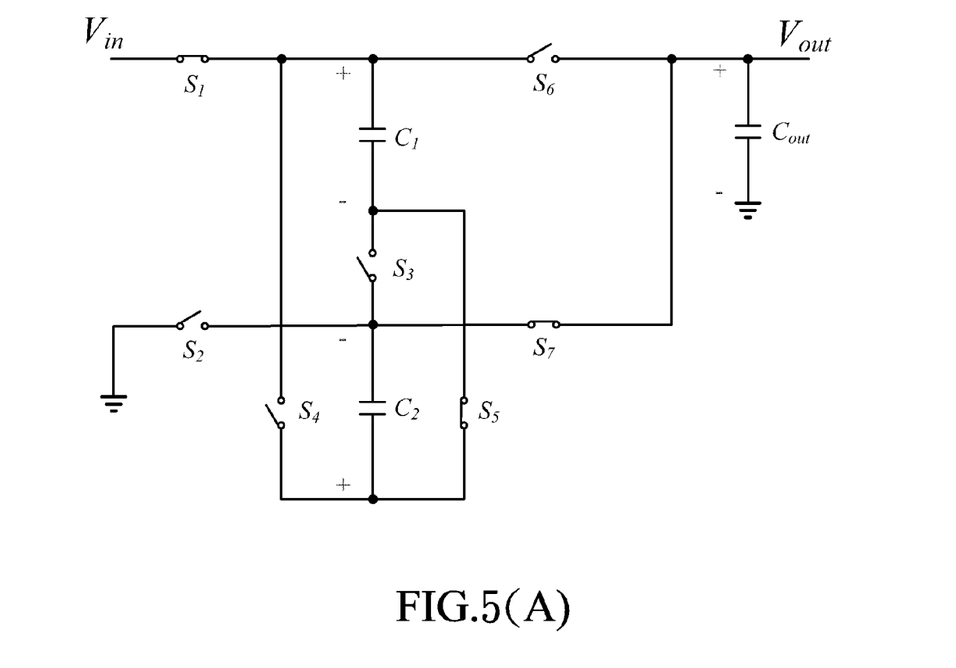
FIG. 5(A) and FIG. 5(B) show a third step-down mode of FIG. 2.
Figure 5B:
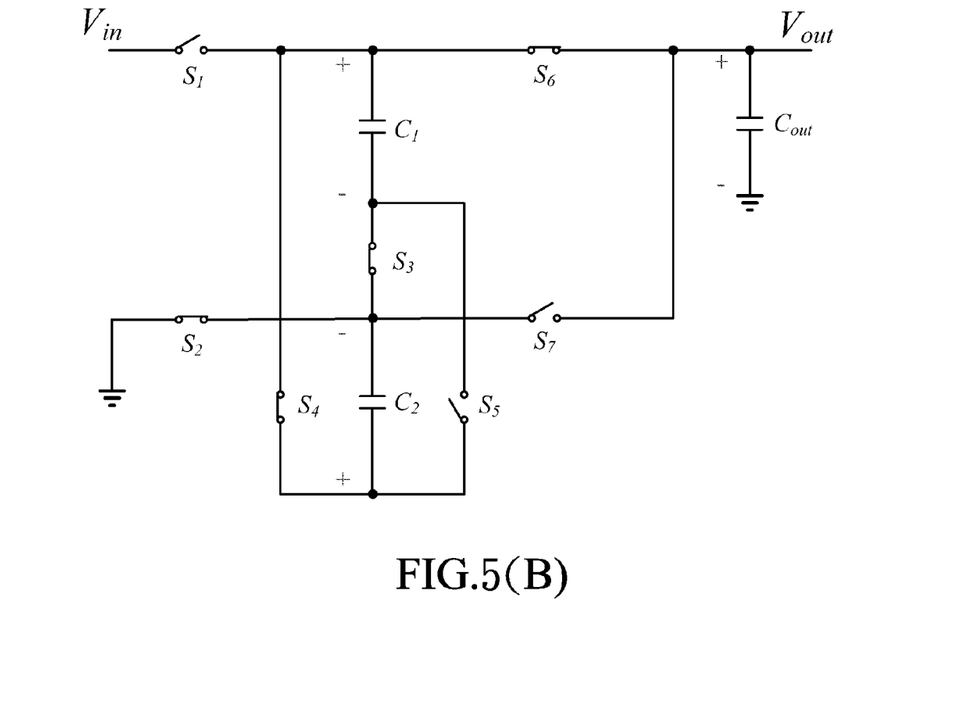

FIG. 5 shows a third step-down mode of FIG. 2. When the voltage ratio ($V_{out}/V_{in}$) of a desired output voltage to the input voltage is ⅓, the switch elements $S_1$, $S_5$ and $S_7$ need to be turned on when the energy storage elements are charged (phase 1), as shown in FIG. 5(A); and the switch elements $S_2$, $S_3$, $S_4$ and $S_6$ need to be turned on when the energy storage elements are discharged (phase 2), as shown in FIG. 5(B).

Figure 6A:
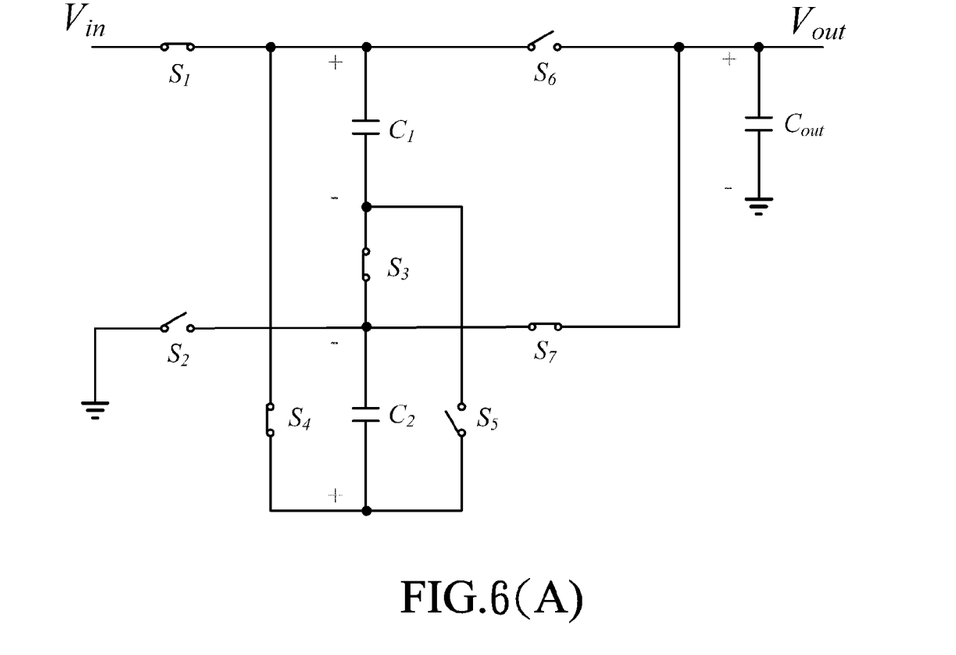
FIG. 6(A) and FIG. 6(B) show a fourth step-down mode of FIG. 2.
Figure 6B:
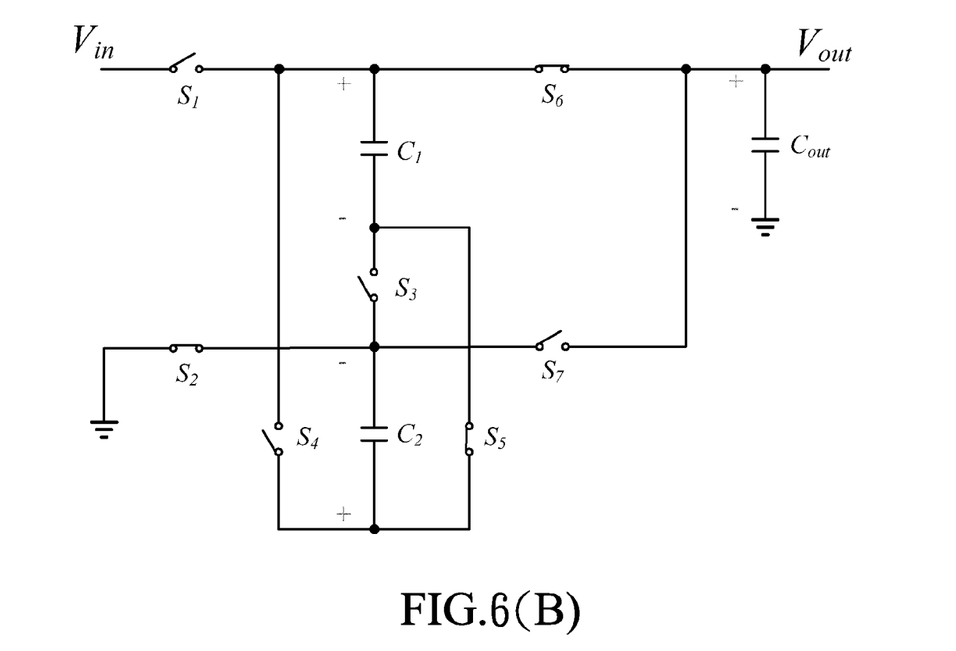

FIG. 6 shows a fourth step-down mode of FIG. 2. When the voltage ratio ($V_{out}/V_{in}$) of a desired output voltage to the input voltage is ⅔, the switch elements $S_1$, $S_3$, $S_4$ and $S_7$ need to be turned on when the energy storage elements are charged (phase 1), as shown in FIG. 6(A); and the switch elements $S_2$, $S_5$ and $S_6$ need to be turned on when the energy storage elements are discharged (phase 2), as shown in FIG. 6(B).

Figure 7:
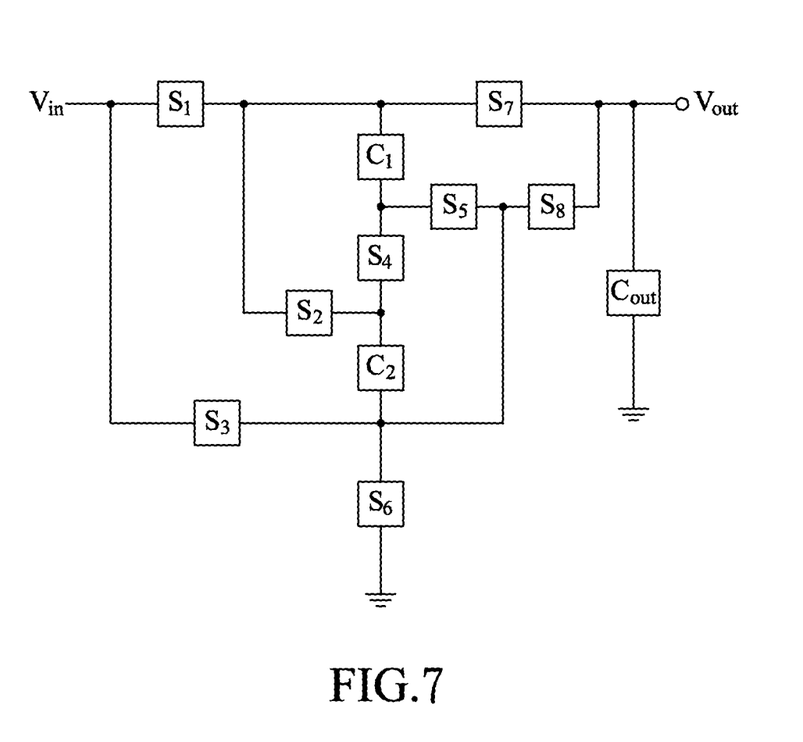
FIG. 7 shows a switch circuit according to another embodiment.

FIG. 7 shows a switch circuit according to another embodiment. The switch circuit includes multiple energy storage elements and multiple switch elements. The switch elements are coupled to the energy storage elements to generate either a step-down mode or a step-up mode. The energy storage elements include a first energy storage element $C_1$, a second energy storage element $C_2$ and a third energy storage element $C_{out}$. The switch elements include a first switch element $S_1$, a second switch element $S_2$, a third switch element $S_3$, a fourth switch element $S_4$, a fifth switch element $S_5$, a sixth switch element $S_6$, a seventh switch element $S_7$, and an eighth switch element $S_8$. As shown in FIG. 7, the first energy storage element $C_1$ has one terminal coupled to the first, second and seventh switch elements $S_1$, $S_2$ and $S_7$, and the other terminal coupled to the fourth and fifth switch elements $S_4$ and $S_5$. The second energy storage element $C_2$ has one terminal coupled to the second and fourth switch elements $S_2$ and $S_4$, and the other terminal coupled to the third, fifth, sixth and eighth switch elements $S_3$, $S_5$, $S_6$ and $S_8$. The third energy storage element $C_{out}$ has one terminal coupled to the seventh and eighth switch elements $S_7$ and $S_8$. In the embodiment, an integrated switch circuit for simultaneously achieving step-down and step-up characteristics is disclosed. In the embodiment, with eight power switch elements, six switching modes (four step-down modes and two step-up modes) are provided to implement a switch circuit adopting least switch elements and rendering most modes, thereby enhancing adaptivity for circuit post-end applications and reducing hardware costs.

Figure 8:
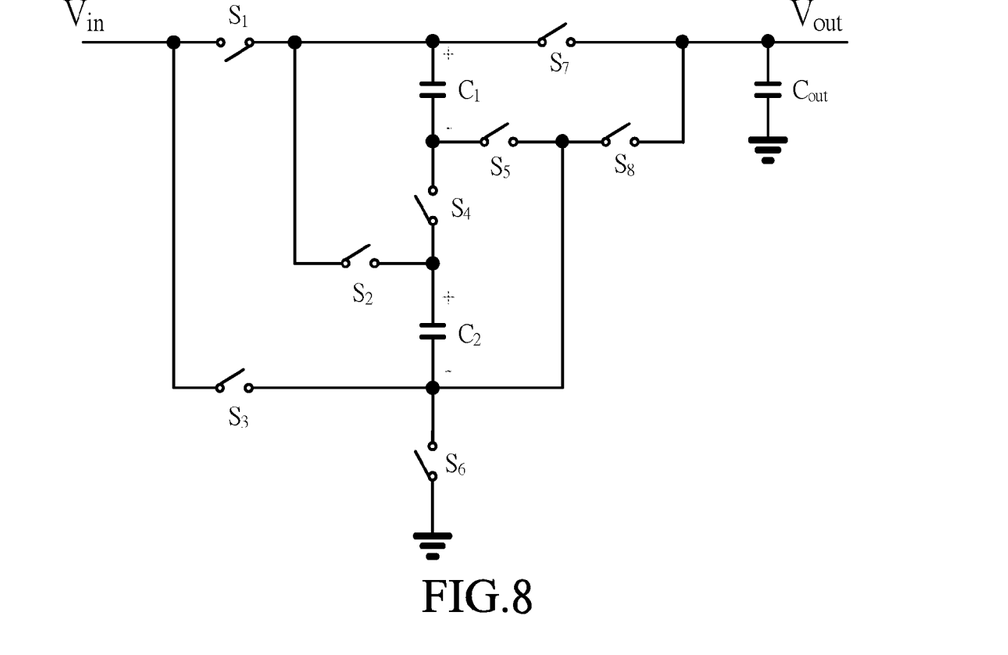
FIG. 8 shows an application example of the capacitors and switches in FIG. 7.

FIG. 8 shows an application example of the capacitors and switches in FIG. 7. FIGS. 9 to 14 show four step-down modes and two step-up modes of FIG. 7. Table-2 shows a voltage ratio ($V_{out}/V_{in}$) of the step-down and step-up modes as well as the switch elements to be turned on between charging (phase 1) and discharging (phase 2) of the energy storage elements.

TABLE 2

| Voltage ratio ($V_{out}/V_{in}$) | Phase 1 (charging) | Phase 2 (discharging) |
|---|---|---|
| 1 | | $S_1, S_2, S_5, S_6, S_7$: on |
| 1/2 | $S_1, S_2, S_5, S_8$: on | $S_2, S_5, S_6, S_7$: on |
| 2/3 | $S_1, S_2, S_5, S_8$: on | $S_4, S_6, S_7$: on |
| 1/3 | $S_1, S_4, S_8$: on | $S_2, S_5, S_6, S_7$: on |
| 2 | $S_1, S_2, S_6$: on | $S_2, S_3, S_7$: on |
| 3 | $S_1, S_2, S_5, S_6$: on | $S_3, S_4, S_7$: on |

Figure 9:
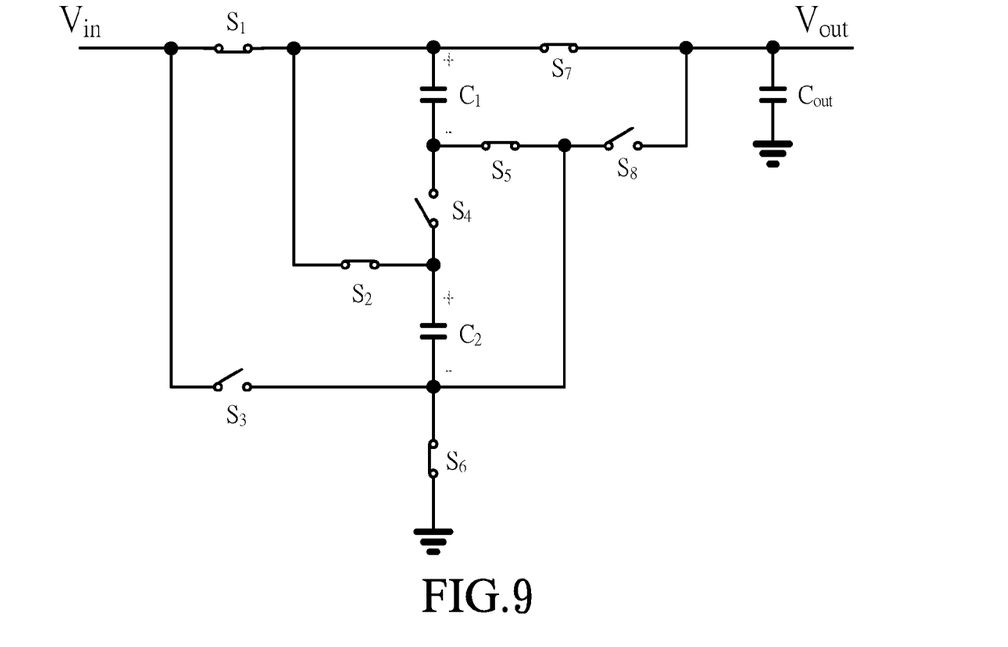
FIG. 9 shows a first step-down mode of FIG. 8.

FIG. 9 shows a first step-down mode of FIG. 8. Referring to FIG. 9, when the voltage ratio ($V_{out}/V_{in}$) of a desired output voltage to the input voltage is 1, the switch elements $S_1$, $S_2$, $S_5$, $S_6$ and $S_7$ need to be turned on regardless of when the energy storage elements are charged (phase 1) or discharged (phase 2).

Figure 10A:
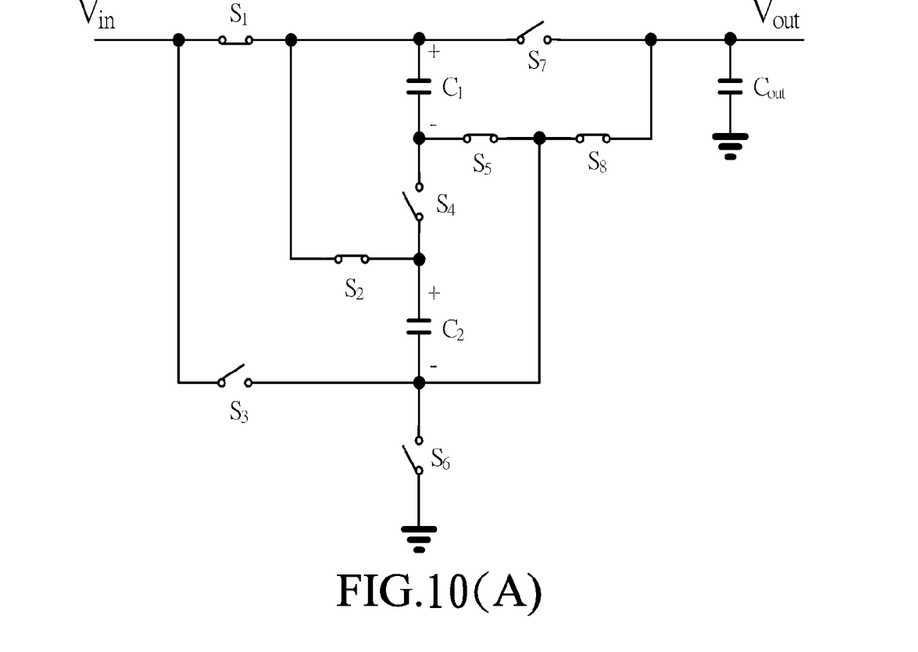
FIG. 10(A) and FIG. 10(B) show a second step-down mode of FIG. 8.
Figure 10B:
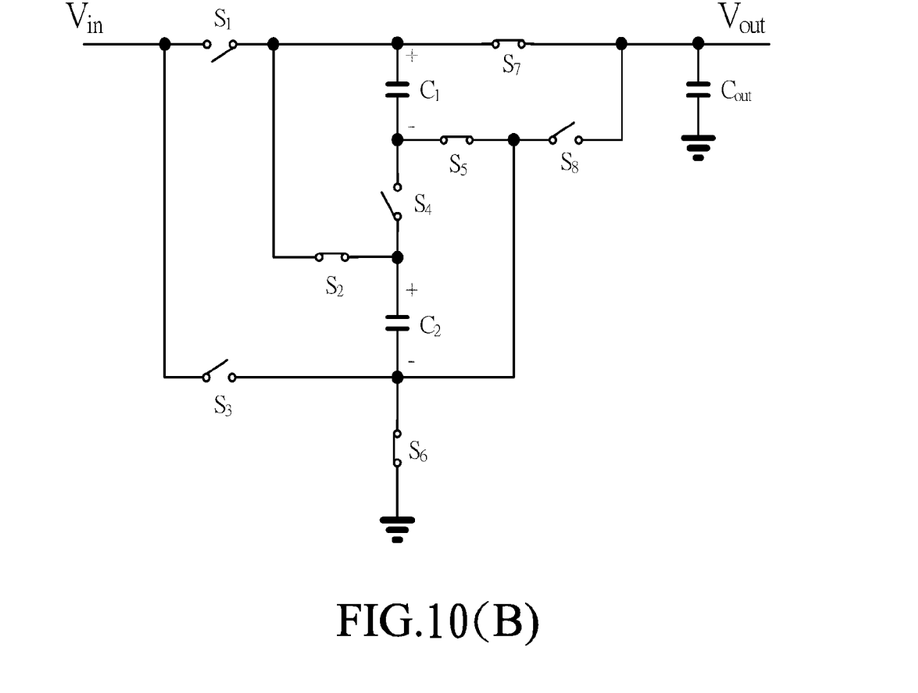

FIG. 10 shows a second step-down mode of FIG. 8. When the voltage ratio ($V_{out}/V_{in}$) of a desired output voltage to the input voltage is ½, the switch elements $S_1$, $S_2$, $S_5$ and $S_8$ need to be turned on when the energy storage elements are charged (phase 1), as shown in FIG. 10(A); and the switch elements $S_2$, $S_5$, $S_6$ and $S_7$ need to be turned on when the energy storage elements are discharged (phase 2), as shown in FIG. 10(B).

Figure 11A:
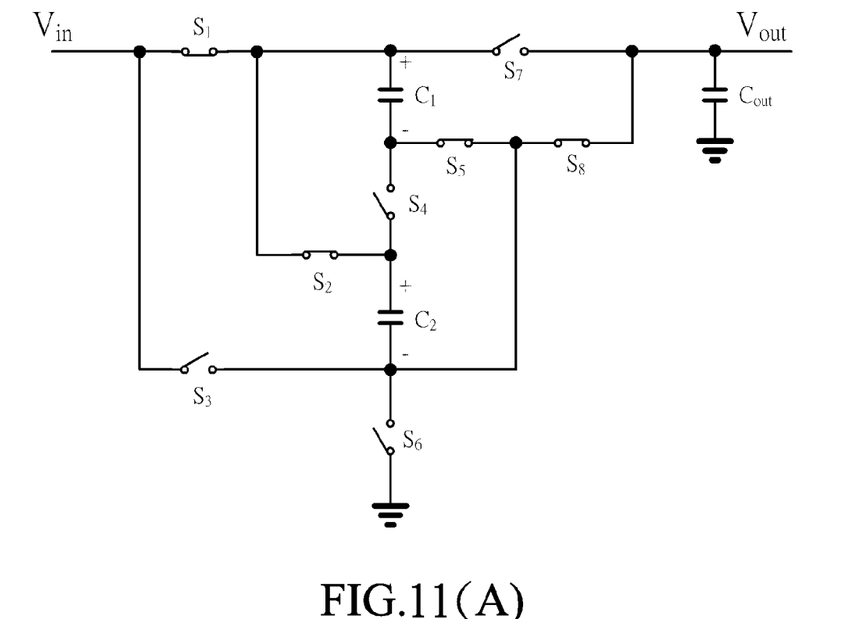
FIG. 11(A) and FIG. 11(B) show a third step-down mode of FIG. 8.
Figure 11B:
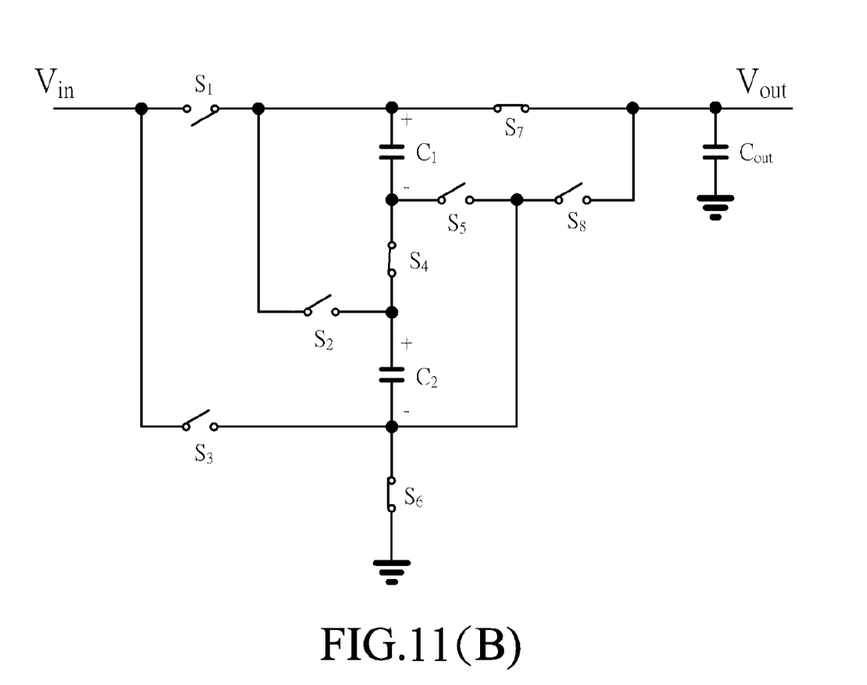

FIG. 11 shows a third step-down mode of FIG. 8. When the voltage ratio ($V_{out}/V_{in}$) of a desired output voltage to the input voltage is ⅔, the switch elements $S_1$, $S_2$, $S_5$ and $S_8$ need to be turned on when the energy storage elements are charged (phase 1), as shown in FIG. 11(A); and the switch elements $S_4$, $S_6$ and $S_7$ need to be turned on when the energy storage elements are discharged (phase 2), as shown in FIG. 11(B).

Figure 12A:
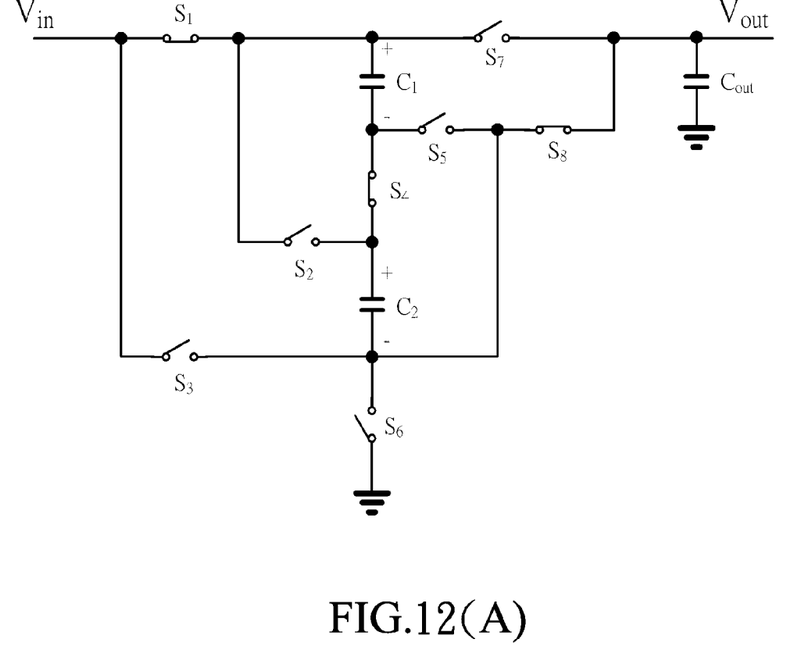
FIG. 12(A) and FIG. 12(B) show a fourth step-down mode of FIG. 8.
Figure 12B:
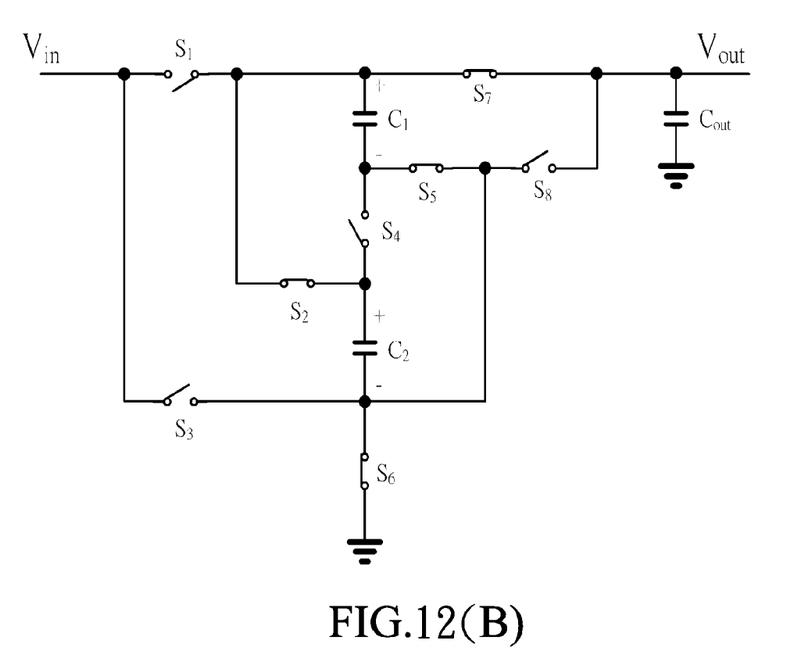

FIG. 12 shows a fourth step-down mode of FIG. 8. When the voltage ratio ($V_{out}/V_{in}$) of a desired output voltage to the input voltage is ⅓, the switch elements $S_1$, $S_4$ and $S_8$ need to be turned on when the energy storage elements are charged (phase 1), as shown in FIG. 12(A); and the switch elements $S_2$, $S_5$, $S_6$ and $S_7$ need to be turned on when the energy storage elements are discharged (phase 2), as shown in FIG. 12(B).

Figure 13A:
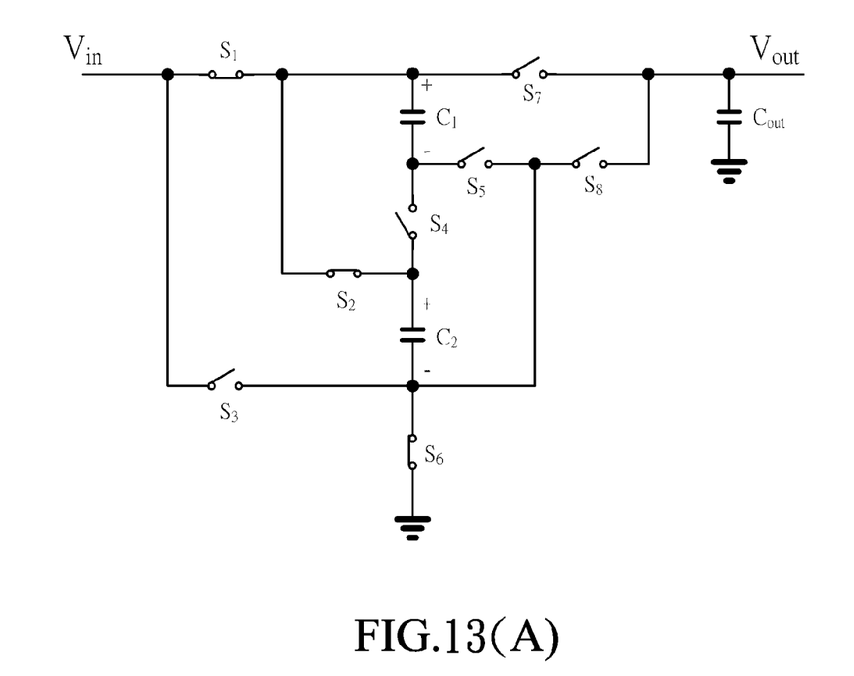
FIG. 13(A) and FIG. 13(B) show a first step-up mode of FIG. 8.
Figure 13B:
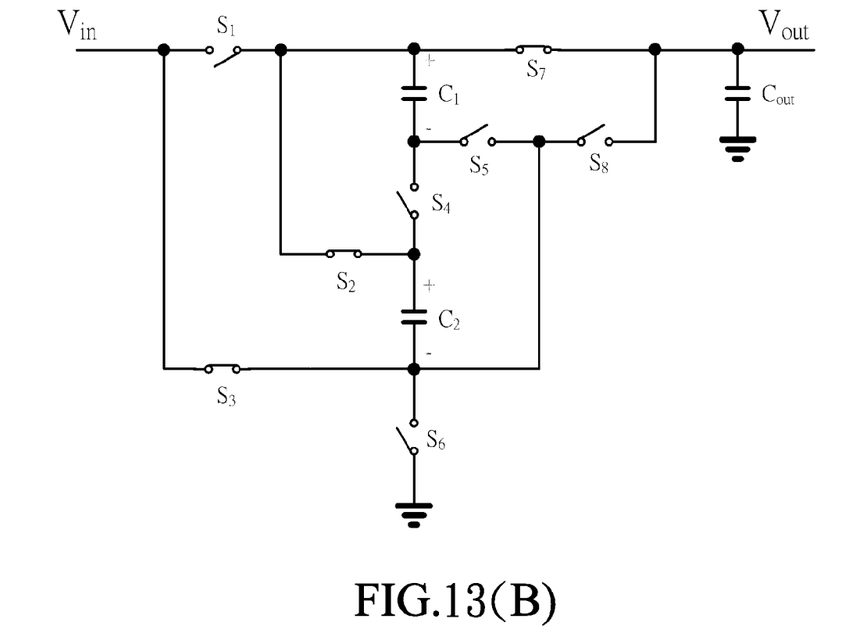

FIG. 13 shows a first step-up mode of FIG. 8. When the voltage ratio ($V_{out}/V_{in}$) of a desired output voltage to the input voltage is 2, the switch elements $S_1$, $S_2$ and $S_6$ need to be turned on when the energy storage elements are charged (phase 1), as shown in FIG. 13(A); and the switch elements $S_2$, $S_3$ and $S_7$ need to be turned on when the energy storage elements are discharged (phase 2), as shown in FIG. 13(B).

Figure 14A:
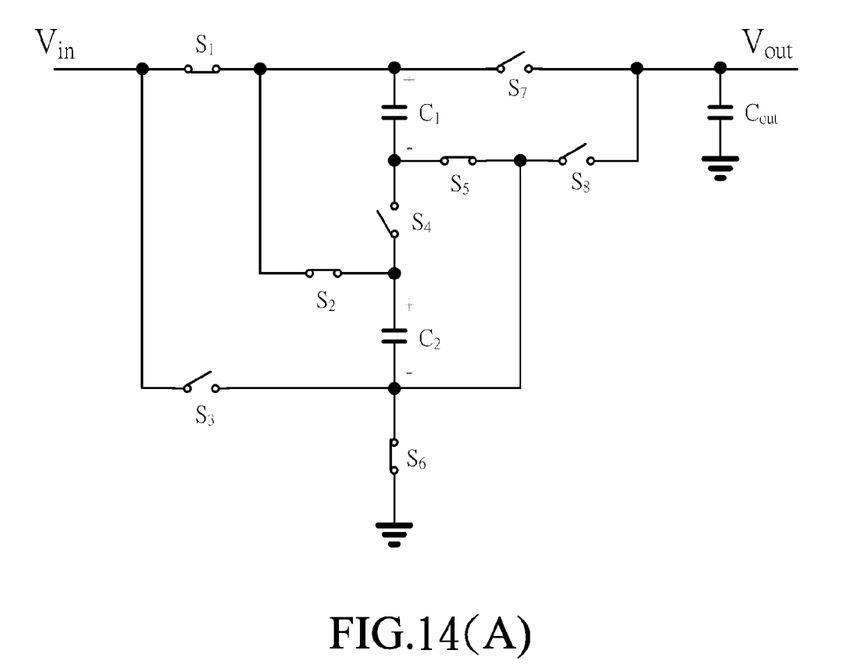
FIG. 14(A) and FIG. 14(B) show a second step-up mode of FIG. 8.
Figure 14B:
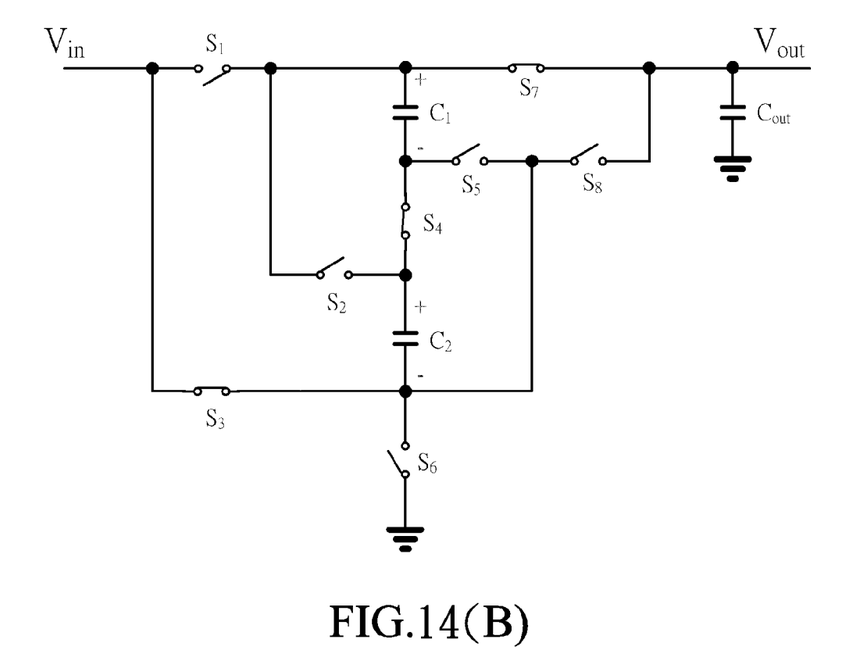

FIG. 14 shows a second step-up mode of FIG. 8. When the voltage ratio ($V_{out}/V_{in}$) of a desired output voltage to the input voltage is 3, the switch elements $S_1$, $S_2$, $S_5$ and $S_6$ need to be turned on when the energy storage elements are charged (phase 1), as shown in FIG. 14(A); and the switch elements $S_3$, $S_4$ and $S_7$ need to be turned on when the energy storage elements are discharged (phase 2), as shown in FIG. 14(B).

Figure 15:
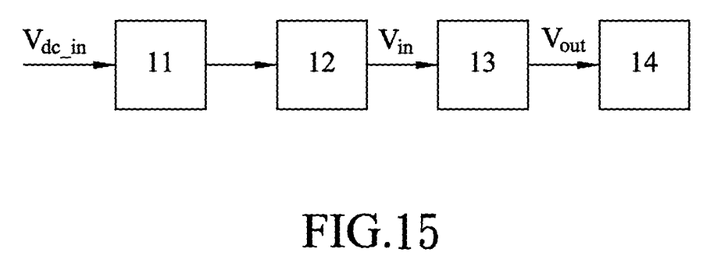
FIG. 15 shows a circuit block diagram of an application according to one embodiment.

FIG. 15 shows a circuit block diagram of an application according to one embodiment. Referring to FIG. 15, a DC voltage input $V_{dc\_in}$ first passes through a voltage detection circuit 11, provides a detection signal to a mode selector 12 for mode switching, and provides a signal to the voltage input $V_{in}$ of the switch circuit 13 of the disclosure according to the selected mode. As such, the switch circuit 13 outputs a voltage $V_{out}$, for driving a driver device 14 (e.g., an LED). Further, different modes switch different control signals for controlling the switch elements. For example, in the circuit in FIG. 2, seven different control signals are switched for controlling the seven switch elements in FIG. 2.

With the embodiments, a switch circuit free of electromagnetic elements and free of electrolytic capacitors is provided. Power switch elements, a controller and a part of resistors in a circuit are all integrated to an integrated circuit, leaving only several resistors and ceramic capacitors as external discrete components. Thus, the volume and weight of a driving circuit are effectively reduced to further lower system costs and prolong the lifecycle of lighting devices.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A switch circuit, comprising:
   a plurality of energy storage elements comprising a first energy storage element, a second energy storage element and a third energy storage element; and
   a plurality of switch elements comprising a first switch element, a second switch element, a third switch element, a fourth switch element, a fifth switch element, a sixth switch element and a seventh switch element, coupled to the energy storage elements to generate a step-down mode;
   wherein the first energy storage element has one terminal coupled to the first, fourth and sixth switch elements, and one other terminal coupled to the third and fifth switch elements; the second energy storage element has one terminal coupled to the second, third and seventh switch elements, and one other terminal coupled to the fourth and fifth switch elements; the third energy storage element has one terminal coupled to the sixth and seventh switch elements; and the step-down mode is generated according to charging and discharging operations of the storage elements and switching operations of the switch elements, and the step-down mode is in plural; and
   wherein the first, second, third, fourth and sixth switch elements are turned on regardless of when the first, second and third energy storage elements are charged or discharged, so that the voltage ratio of a desired output voltage across the third energy storage element to the voltage of an input power directly connected to the first switch element is 1.

2. The switch circuit according to claim 1, wherein each of the energy storage elements is a capacitor, and each of the switch elements is a bipolar junction transistor (BJT) or metal oxide semiconductor (MOS) element.

3. The switch circuit according to claim 1, wherein the switch circuit comprises four step-down modes.

4. A switch circuit, comprising:
   a plurality of energy storage elements comprising a first energy storage element, a second energy storage element and a third energy storage element; and
   a plurality of switch elements comprising a first switch element, a second switch element, a third switch element, a fourth switch element, a fifth switch element, a sixth switch element and a seventh switch element, coupled to the energy storage elements to generate a step-down mode;
   wherein the first energy storage element has one terminal coupled to the first, fourth and sixth switch elements, and one other terminal coupled to the third and fifth switch elements; the second energy storage element has one terminal coupled to the second, third and seventh switch elements, and one other terminal coupled to the fourth and fifth switch elements; the third energy storage element has one terminal coupled to the sixth and seventh switch elements; and the step-down mode is generated according to charging and discharging operations of the storage elements and switching operations of the switch elements, and the step-down mode is in plural; and
   wherein the first, third, fourth and seventh switch elements are turned on when the first, second and third energy storage elements are charged, and the second, third, fourth and sixth switch elements are turned on when the first, second and third energy storage elements are discharged, so that the voltage ratio of a desired output voltage across the third energy storage element to the voltage of an input power directly connected to the first switch element is ½.

5. The switch circuit according to claim 4, wherein each of the energy storage elements is a capacitor, and each of the switch elements is a bipolar junction transistor (BJT) or metal oxide semiconductor (MOS) element.

6. A switch circuit, comprising:
   a plurality of energy storage elements comprising a first energy storage element, a second energy storage element and a third energy storage element; and
   a plurality of switch elements comprising a first switch element, a second switch element, a third switch element, a fourth switch element, a fifth switch element, a sixth switch element and a seventh switch element, coupled to the energy storage elements to generate a step-down mode;
   wherein the first energy storage element has one terminal coupled to the first, fourth and sixth switch elements, and one other terminal coupled to the third and fifth switch elements; the second energy storage element has one terminal coupled to the second, third and seventh switch elements, and one other terminal coupled to the fourth and fifth switch elements; the third energy storage element has one terminal coupled to the sixth and seventh switch elements; and the step-down mode is generated according to charging and discharging operations of the storage elements and switching operations of the switch elements, and the step-down mode is in plural; and
   wherein the first, fifth and seventh switch elements are turned on when the first, second and third energy storage elements are charged, and the second, third, fourth and sixth switch elements are turned on when the first, second and third energy storage elements are discharged, so that the voltage ratio of a desired output voltage across the third energy storage element to the voltage of an input power directly connected to the first switch element is $\frac{1}{3}$.

7. The switch circuit according to claim 6, wherein each of the energy storage elements is a capacitor, and each of the switch elements is a bipolar junction transistor (BJT) or metal oxide semiconductor (MOS) element.

8. A switch circuit, comprising:
a plurality of energy storage elements comprising a first energy storage element, a second energy storage element and a third energy storage element; and
a plurality of switch elements comprising a first switch element, a second switch element, a third switch element, a fourth switch element, a fifth switch element, a sixth switch element and a seventh switch element, coupled to the energy storage elements to generate a step-down mode;
wherein the first energy storage element has one terminal coupled to the first, fourth and sixth switch elements, and one other terminal coupled to the third and fifth switch elements; the second energy storage element has one terminal coupled to the second, third and seventh switch elements, and one other terminal coupled to the fourth and fifth switch elements; the third energy storage element has one terminal coupled to the sixth and seventh switch elements; and the step-down mode is generated according to charging and discharging operations of the storage elements and switching operations of the switch elements, and the step-down mode is in plural; and
wherein the first, third, fourth and seventh switch elements are turned on when the first, second and third energy storage elements are charged, and the second, fifth and sixth switch elements are turned on when the first, second and third energy storage elements are discharged, so that the voltage ratio of a desired output voltage across the third energy storage element to the voltage of an input power directly connected to the first switch element is $\frac{2}{3}$.

9. The switch circuit according to claim 8, wherein each of the energy storage elements is a capacitor, and each of the switch elements is a bipolar junction transistor (BJT) or metal oxide semiconductor (MOS) element.

* * * * *